TELEPHONE STATION APPARATUS

Filed July 25, 1966 2 Sheets-Sheet 1

INVENTORS M. S. HAWLEY
D. W. McLELLAN
BY
Harry L. Newman
ATTORNEY

United States Patent Office 3,303,289

Patented Feb. 7, 1967

3,303,289

TELEPHONE STATION APPARATUS

Melville S. Hawley, Indianapolis, Ind., and Donald W. McLellan, Laurence Harbor, N.J., assignors to Bell Telephone Laboratories, Incorporated, Berkeley Heights, N.J., a corporation of New York Filed July 25, 1966, Ser. No. 567,688
5 Claims. (Cl. 179—86)

This application is a continuation-in-part of copending application Serial No. 367,509, filed May 14, 1964, which application is itself a continuation-in-part of application Serial No. 204,433, filed June 22, 1962, and subsequently issued on December 14, 1965, as Patent 3,223,788.

The invention herein set forth is directed to telephone station apparatus including means for isolating the apparatus from ground.

The transmission of speech in telephone systems is generally accomplished over telephone lines comprising pairs of conductors that extend between individual stations and a central office, the central office providing the switching apparatus by means of which the lines are interconnected. The telephone lines are frequently strung on the same poles as power lines and where this occurs voltages are induced in the telephone lines. If the telephone lines are connected to ground, approximately equal currents flow through the conductors of each line to ground. However, unless the impedance of the path to ground is the same in each conductor of a line, there is a difference between the voltage drops in the conductors. This voltage differential introduces noise currents that are transmitted along with any voice currents that are present on the line.

When there is multiparty service on a telephone line, the ringer of each station on the line is connected between one of the conductors and ground. While it is possible to have an equal number of ringers on each conductor of the line, impedance unbalance usually exists because of the relative location of the ringers on the line and because of the differences in the impedances of different types of ringers. Consequently, induced noise currents are a problem.

When there is single party service on a telephone line, only a single ringer is present on the line, and it is generally bridged across the line. Consequently, the ringer does not provide a path to ground for either of the conductors of the line. However, if it were not for the induced noise problem, it would be advantageous to connect the ringers of single party lines between one of the conductors of the line and ground. Such an arrangement would cut the impedance of the signaling path in half, thereby markedly reducing the signaling power requirement. In addition, such an arrangement would permit a dedicated plant in which by simply making the proper change at the central office a station can be provided with either private or multiparty service, depending upon the wishes of the subscriber then using the station. It would be unnecessary for a service man to make any changes at the station location. Finally, such an arrangement would permit off-hook ringing to be employed to notify a subscriber that his handset is not properly seated in its cradle.

When there is a pay station on a telephone line, the telephone line is connected to ground through the coin relay when the handset is removed from its cradle and a dime is deposited in the coin slot. Although the coin relay serves to connect both conductors of the line to ground, there is nearly always a difference in impedance between the two conductors. Thus induced noise currents are again a problem.

Induced noise is presently alleviated in multiparty lines by inserting one or more gas tube elements in series with the ringers. The gas tubes create substantially infinite impedances between the conductors of the line and ground and thereby essentially disconnect the conductors from ground. In order to operate the gas tube elements, however, a unidirectional potential of a certain magnitude must be applied to the line to ignite and to sustain conduction through the elements.

In some areas of the telephone plant, equipment for providing this unidirectional potential is not available. In other areas of the telephone plant, unidirectional potential of this magnitude is normally applied to the line during times other than signaling. Thus the gas tube elements cannot always be employed, and where they are employed, they are relatively costly both in terms of power consumption and the necessary power supply apparatus required at the central office. In addition, the gas tube elements have a limited operating life, are subject to damage by mechanical shock, and are generally bulky in size.

An object of this invention is to effect telephone operation in an economical and efficient manner while at the same time eliminating noise due to impedance unbalance.

Specifically, an object of this invention is to permit apparatus of a telephone station to be connected between one of the conductors of a telephone line and the ground without introducing objectionable noise or increasing the power requirements of the station.

These and other objects of this invention are achieved in an illustrative embodiment thereof wherein a ringer and a switching network are serially connected between one of the conductors of a telephone line and ground. The switching network includes a pair of polarized switching elements, each of which comprises four layers of semiconductive material arranged in succession with contiguous layers being of opposite conductivity type. The switching elements are electrically interconnected in parallel and poled oppositely with respect to each other.

In one embodiment of the invention, the switching network comprises a pair of four layer bistable semiconductor triodes that remain in a high impedance condition during the application of voltages below a predetermined level, but switch to a low impedance condition upon the introduction of a base current.

In a second embodiment of the invention, the switching network comprises a four layer bistable semiconductor triode in combination with a four layer bistable semiconductor diode, the triode being switched to a low impedance condition by the introduction of a base current and the diode being switched to a low impedance condition by a doubling of the peak ringing voltage.

A complete understanding of the invention and of these and other features and advantages thereof may be gained from consideration of the following detailed description taken in conjunction with the accompanying drawing wherein several embodiments of the invention are illustrated. It is to be expressly understood, however, that the drawing is for the purpose of illustration and description and is not to be construed as defining the limits of the invention.

Figure 1:
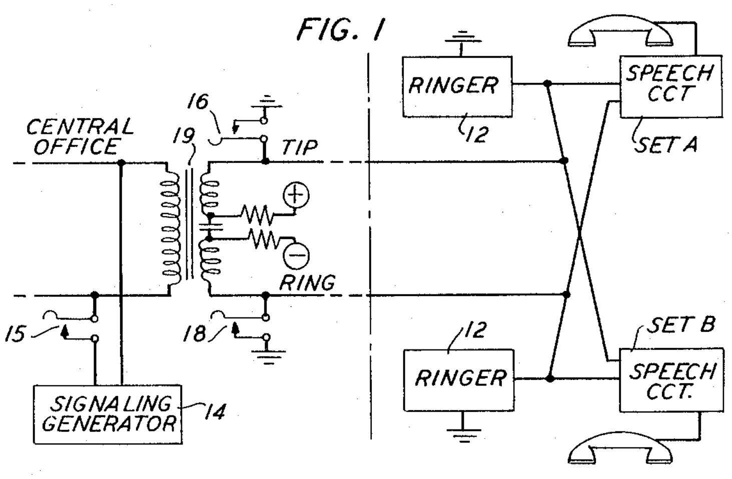
FIG. 1 illustrates a typical party line subscriber loop.

Referring to FIG. 1 of the drawing, a two party line subscriber loop is shown comprising a telephone line 10 that originates at a central office and terminates at a forked connection through which telephone sets A and B, which share the loop, are afforded access to the line. The line 10 comprises a tip and a ring conductor, and as in conventional partly line ringing, each of the sets A and B has its own ringer 12 that is connected between an individual one of the conductors and ground. In this case, the ringer of the set A is connected between the tip conductor and ground and the ringer of the set B is connected between the ring conductor and ground.

The central office includes a signaling generator 14 which, upon the closure of a ringing key 15, applies a ringing signal, such as twenty cycles per second alternating current voltage, to the line 10 for actuating one of the ringers 12. A pair of grounding keys 16 and 18 are associated with the line 10 for respectively applying ground potential to the tip and the ring conductors of the line. Selective ringing is then accomplished by closing the ringing key 15 and at the same time closing the grounding key 16 or 18 associated with the conductor over which no signaling is to proceed. Thus, for example, if it is desired to energize the ringer 12 of set A, keys 15 and 18 are closed so that although a ringing signal is applied to both the tip and the ring conductors via a transformer 19, the ringer of set B is shunted by the ground path through the grounding key 18.

Figure 2:
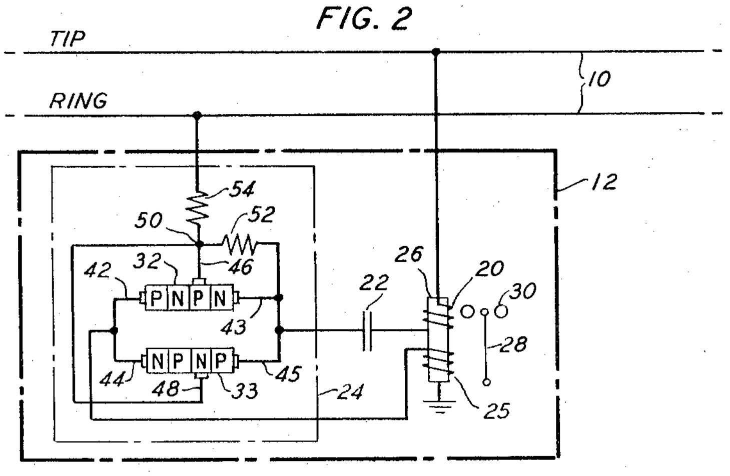
FIG. 2 shows a first embodiment of the invention.

In the embodiment of the invention shown in FIG. 2, the ringer 12 comprises a first coil 20, a capacitor 22, a switching network 24, and a second coil 25 all electrically connected in series. The first coil 20 is connected to the tip conductor, and the second coil 25 is connected to ground. In addition, the coils 20 and 25 are physically wound in series aiding fashion on a common magnetic core 26, and the coils when energized serve to provide sufficient magnetic flux to vibrate a clapper arm 28 between a pair of gongs 30. One example of a ringer structure adapted to carry a pair of series aiding wound coils is described in United States Patent 2,547,537, issued on April 3, 1951, to J. R. Power.

Figure 3:
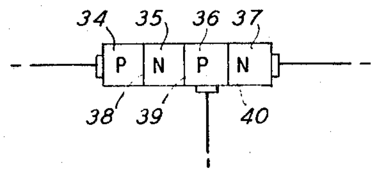
FIG. 3 is a diagrammatic representation of a four layer semiconductor triode of the general type used in the first embodiment of the invention.

The switching network 24 includes a pair of three terminal semiconductor switching elements 32 and 33 commonly known as silicon controlled rectifiers and herein referred to as triodes. As shown diagrammatically in FIG. 3, each of the triodes consists of an integral body of semiconductor material, monocrystalline silicon, for example, that is composed of four distinct layers 34, 35, 36 and 37 arranged in succession. Layers 34 and 36 exhibit P-type conductivity, that is to say, they are characterized by an excess of holes or electron acceptors, and layers 35 and 37 exhibit N-type conductivity, or in other words, are characterized by an abundance of free electrons. Thus contiguous layers are of opposite conductivity type, and they provide rectifying junctions 38, 39 and 40. Each triode also includes a pair of terminal electrodes that are respectively connected to the outer layers 34 and 37 and a base electrode that is connected to one of the intermediate layers 35 and 36. If, as in the case of the triode 32, the base electrode is connected to the P layer 36, the triode is a positive base triode. Whereas if, as in the case of the triode 33, the base electrode is connected to the N layer 35, the triode is a negative base triode.

Figure 4:
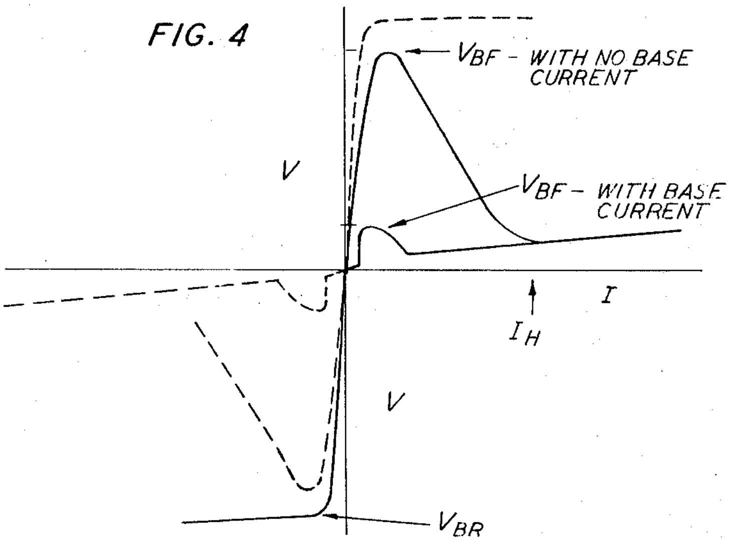
FIG. 4 depicts graphically a typical voltage current characteristic exhibited by the switching network shown in FIG. 1.

The base electrode serves to switch the triode from a high impedance condition to a low impedance condition without the need for exceeding a high breakdown voltage. In essence, this is accomplished by the base electrode injecting enough current into the PNPN structure to cause the junction 39 to become conductive. Thus, as shown by the voltage current characteristics of FIG. 4, when no base current is introduced, the triode behaves in the same manner as a diode, that is, a high forward breakdown voltage $V_{BF}$ or reverse breakdown voltage $V_{BR}$ must be exceeded before current of any consequence flows through the triode. But upon the introduction of a base current, the forward breakdown voltage $V_{BF}$ is greatly reduced. For a more detailed discussion of the PNPN triode, reference is directed to an article by I. M. Mackintosh entitled, "The Electrical Characteristics of Silicon PNPN Triodes," appearing in the June 1958 issue of Procedings of the IRE at page 1229.

In accordance with the invention, the triodes 32 and 33 are connected in parallel and oppositely poled, terminal electrodes 42 and 43 of the triode 32 being respectively connected to terminal electrodes 44 and 45 of the triode 33. In addition, base electrodes 46 and 48 of the triodes 32 and 33 are connected to a common junction point 50, and a resistor 52 is connected between the terminal electrode 43 of the triode 32 and the junction point 50. Finally, the base electrodes 46 and 48 are connected through junction point 50 and a resistor 54 to the ring conductor of the telephone line 10, this being the conductor that the ringer 12 does not connect to ground.

The resistors 52 and 54 provide a voltage divider network and limit the base current. In addition, the resistor 54 has a relatively high resistance, as for example, 50 kilohms or more, so that little ringing current flows through the path comprising the resistor 54, the resistor 52, the capacitor 22, and the coil 20.

Referring also to FIG. 1, in the operation of this first embodiment of the ringer 12 a ringing signal is applied by closing the ringing key 15, whereby the signal generator 14 is connected through the transformer 19 to the line 10, and by closing the grounding key 18, whereby the ring conductor of the line is connected to ground. Hence the ringing voltage is applied between the tip conductor and ground. Since the coil 20 of the ringer 12 is connected to the tip conductor and the coil 25 is connected to ground, the ringing voltage is applied across the ringer, a portion of the voltage appearing across the terminal electrodes 42 and 43 of the triode 32 and the terminal electrodes 44 and 45 of the triodes 33. In addition, since the base electrodes 46 and 48 of the triodes 32 and 33 are connected to the grounded ring conductor of the line 10, a portion of the voltage appears across the terminal and base electrodes 43 and 46 of the triode 32 and across the terminal and base electrodes 45 and 48 of the triode 33. As a result, base current flows through the triodes 32 and 33 on alternate half cycles of the voltage, greatly reducing the forward breakdown voltage $V_{BF}$ of the triodes.

During the positive half cycles of the voltage, base current flows from the tip conductor of the line 10 through the coil 20, the capacitor 22, the triode 33 between the terminal and base electrodes 45 and 48 thereof, the resistor 54, and the ring conductor to ground. This places the triode 33 in a low impedance condition and current flows from the tip conductor through the coil 20, the capacitor 22, the triode 33 between the terminal electrodes 45 and 44 thereof, and the coil 25 to ground. During the negative half cycles of the voltage, base current flows from ground through the ring conductor, the resistor 54, the triode 32 between the base and terminal electrodes 46 and 43 thereof, the capacitor 22, and the coil 20 to the tip conductor. This places the triode 32 in a low impedance condition and current flows from ground through the coil 25, the triode 32 between the terminal electrodes 42 and 43 thereof, the capacitor 22, and the coil 20 to the tip conductor.

During times other than ringing, should there be an induced voltage imposed on the line 10, very little potential difference appears across the base and terminal electrodes of the triodes 32 and 33 and therefore an insignificant amount of base current is introduced. The only other voltage of consequence is the line battery voltage, and any base current that might flow because of this is blocked by the capacitor 22. Consequently, the triodes 32 and 33 behave as PNPN diodes and a high breakdown voltage must be exceeded before the triodes revert to a low impedance state. Furthermore, since it is not necessary, as in the case of the PNPN diodes, for the ringing voltage to exceed a high breakdown voltage level in order to reduce the triodes 32 and 33 to a low impedance state, the triodes can be selected to have a high breakdown voltage level that greatly exceeds the ringing voltage.

Figure 5:
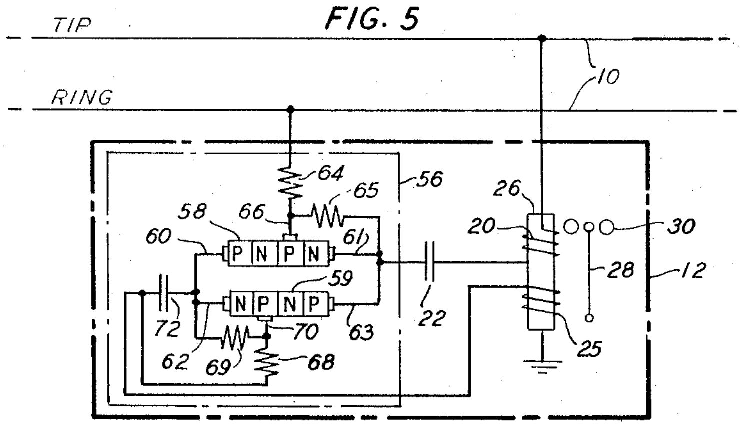
FIG. 5 illustrates a second embodiment of the invention.

Referring now to FIG. 5, in a second embodiment of the invention, the ringer 12 comprises the coils 20 and 25 and the capacitor 22 connected between the tip conductor of the telephone line 10 and ground through a switching network 56. The switching network 56 includes a pair of positive base PNPN triodes 58 and 59 connected in parallel and oppositely poled, terminal electrodes 60 and 61 of the triode 58 being respectively connected to terminal electrodes 62 and 63 of the triode 59.

A pair of resistors 64 and 65 form a voltage divider network for the triode 58. The resistor 64 is connected in series with a base electrode 66 of the triode 58, and the resistor 65 is connected between the base electrode and the terminal electrode 61. Similarly, a pair of resistors 68 and 69 form a voltage divider network for the triode 59. The resistor 68 is connected in series with a base electrode 70 of the triode 59, and the resistor 69 is connected between the base electrode and the terminal electrode 62.

Finally, the base electrode 66 of the triode 58 is connected through the resistor 64 to the ring conductor of the telephone line 10, which is the conductor the ringer 12 does not connect to ground. The base electrode 70 of the triode 59, on the other hand, is connected through the resistor 68 across a capacitor 72 that is connected in series with the terminal electrodes 60 and 62 of the triodes 58 and 59 respectively.

With this arrangement, during the negative portion of the ringing voltage, base current flows from ground through the ring conductor of the line 10, the resistor 64, the triode 58 between the base and terminal electrodes 66 and 61 thereof, the capacitor 22, and the coil 20 to the tip conductor, to place the triode in a low impedance condition. Current thereupon flows from ground through the coil 25, the capacitor 72, the triode 58 between the terminals 60 and 61 thereof, the capacitor 22, and the coil 20 to the tip conductor. The capacitor 72 is thereby charged and upon the reversal of the polarity of the ringing voltage, the capacitor discharges and provides a base current through the resistor 68 and through the triode 59 between the base and terminal electrodes 70 and 62. The triode 59 is thereby placed in a low impedance condition, and current flows from the tip conductor through the coil 20, the capacitor 22, the triode between the terminal electrodes 63 and 62 thereof, the capacitor 72, and the coil 25 to ground.

In the case of induced voltages, there is little or no difference in potential across the line 10 available for providing base current. Consequently, the triode 58 does not conduct and the capacitor 72 is not charged. The ringer 12 is therefore isolated from ground unless the induced voltage exceeds the $V_{BF}$ with no base current (FIG. 4) of the triode 59.

Figures 6, 7:
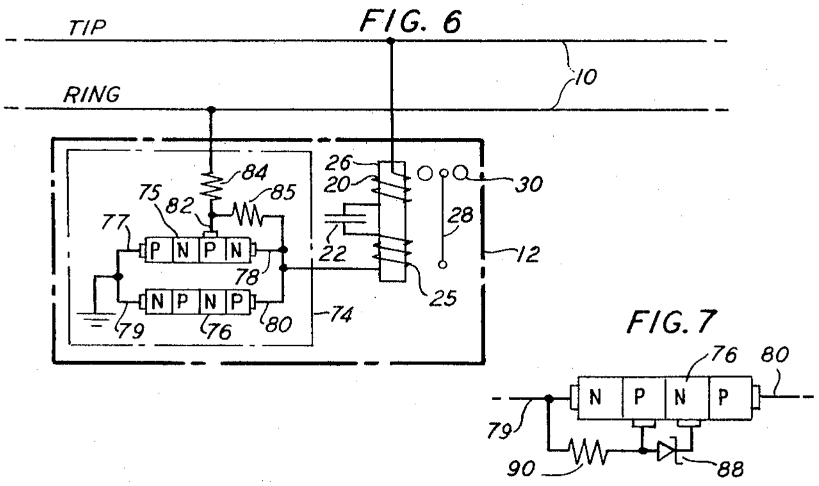
FIG. 6 illustrates a third embodiment of the invention.
FIG. 7 shows a modification of the third embodiment.

In a third embodiment of the invention, shown in FIG. 6, the ringer 12 comprises the coils 20 and 25 and the capacitor 22 connected between the tip conductor of the telephone line 10 and ground through a switching network 74. The switching network 74 includes a positive base PNPN triode 75 and a PNPN diode 76 connected in parallel and oppositely poled, terminal electrodes 77 and 78 of the triode being respectively connected to terminal electrodes 79 and 80 of the diode. A base electrode 82 of the triode 75 is connected to the ring conductor of the telephone line 10 through a resistor 84 and a resistor 85 is connected between the base electrode 82 and the terminal electrode 78. The resistors 84 and 85 provide a voltage divider network.

During the negative portion of the ringing voltage, base current flows from ground through the ring conductor of the line 10, the resistor 84, the triode 75 between the base and terminal electrodes 82 and 78 thereof, the coil 25, the capacitor 22, and coil 20 to the tip conductor. The triode is thereby placed in a low impedance condition and current flows from ground through the triode 75 between the terminals 77 and 78 thereof, the coil 25, the capacitor 22, and the coil 20 to the tip conductor.

As is true in both the first and second embodiments, this flow of ringing current charges the capacitor 22 to the ringing voltage. However, in this embodiment the charge on the capacitor 22 is employed to cause the diode 76 to conduct. Thus during the positive portion of the ringing voltage the charge on the capacitor 22 approximately doubles the ringing voltage applied to the diode 76, and by selecting the diode to have a forward breakdown voltage just under this voltage, the diode breaks down. As soon as the diode 76 breaks down current flows from the tip conductor of the line 10 through the coil 20, the capacitor 22, the coil 25, and the diode 76 to ground.

When there is an induced voltage on the line 10, there is little or no difference in potential across the line for providing base current. The triode 75 therefore does not conduct and the capacitor 22 is not charged. Thus the ringer 12 is isolated from ground unless the induced voltage exceeds the forward breakdown voltage of the diode 76.

Since the present state of the art with respect to PNPN diodes is such that it is difficult to control their forward breakdown voltage, a Zener diode 88 may be connected between the two intermediate layers of the diode 76 in the manner shown in FIG. 7 and a resistor 90 connected between the terminal electrode 79 and the Zener diode. The Zener diode 88 then sets the threshold voltage, the resistor 90 serving to divert leakage.

Although several specific embodiments of the invention have been shown and described, it will be understood that they are but illustrative and that various modifications may be made therein without departing from the scope and spirit of this invention as defined in the appended claims.

What is claimed is:

1. Telephone station apparatus comprising a coil; a capacitor; a switching network comprising a first and a second switching element, each of which comprises two layers of P-type semiconductor material arranged alternately with two layers of N-type semiconductor material, each switching element having a first terminal electrode making electrical contact with the outer P layer thereof and a second terminal electrode making electrical contact with the outer N layer thereof, and one of the switching elements having a base electrode making electrical contact with an intermediate layer thereof, circuit means for connecting the first terminal electrode of the first switching element with the second terminal electrode of the second switching element and the second terminal electrode of the first switching element with the first terminal electrode of the second switching element; a series path comprising the coil, the capacitor, and the circuit means and switching elements of the switching network, one end of the series path being connected to one conductor of a telephone line, the other end of the series path being connected to ground, and the base electrode being connected to the second conductor of the telephone line.

2. Telephone station apparatus as in claim 1 wherein the base electrode makes electrical contact with the intermediate P layer of the switching element.

3. Telephone station apparatus as in claim 2 wherein the other switching element has a base electrode making electrical contact with the intermediate N layer thereof, both base electrodes being connected to the second conductor of the telephone line.

4. Telephone station apparatus as in claim 2 wherein the other switching element has a base electrode making electrical contact with the intermediate P layer thereof and the base electrode is connected across the capacitor.

5. Telephone station apparatus as in claim 2 further including means responsive to the flow of an alternating current through the coil for generating an audible sound.

No references cited.

KATHLEEN H. CLAFFY, *Primary Examiner.*

H. ZELLER, *Assistant Examiner.*